US012649444B2

(12) United States Patent
Wang

(10) Patent No.: US 12,649,444 B2
(45) Date of Patent: Jun. 9, 2026

(54) BATTERY SWAP APPARATUS AND BATTERY SWAP SYSTEM

(71) Applicant: CONTEMPORARY AMPEREX TECHNOLOGY (HONG KONG) LIMITED, Hong Kong (CN)

(72) Inventor: Xia Wang, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 457 days.

(21) Appl. No.: 18/126,293

(22) Filed: Mar. 24, 2023

(65) Prior Publication Data

US 2023/0234540 A1     Jul. 27, 2023

Related U.S. Application Data

(63) Continuation of application No. PCT/CN2021/119640, filed on Sep. 22, 2021.

(51) Int. Cl.
*B60S 5/06* (2019.01)

(52) U.S. Cl.
CPC ...................................... *B60S 5/06* (2013.01)

(58) Field of Classification Search
CPC ..... B60S 5/06; B60K 1/04; B60K 2001/0455; B60K 2001/0472; B60K 2001/0494;
(Continued)

(56) References Cited

U.S. PATENT DOCUMENTS

| | | | |
|---|---|---|---|
| 4,790,249 A | 12/1988 | Webb | |
| 2008/0258682 A1 * | 10/2008 | Li | B60L 50/66 320/109 |
| 2020/0406780 A1 | 12/2020 | Hassounah | |

FOREIGN PATENT DOCUMENTS

| | | |
|---|---|---|
| CN | 1605514 A | 4/2005 |
| CN | 101890942 A | 11/2010 |

(Continued)

OTHER PUBLICATIONS

Decision to Grant a Patent issued Jul. 2, 2024 in Japanese Patent Application No. 2023-518778 with English translation thereof.
Office Action issued Sep. 20, 2024 in Korean Patent Application No. 10-2023-7010333 with English translation thereof.
International Search Report issued May 12, 2022 in International Patent Application No. PCT/CN2021/119640 with English translation thereof.

(Continued)

*Primary Examiner* — Drew J Brown
(74) *Attorney, Agent, or Firm* — XSENSUS LLP

(57) ABSTRACT

The present application relates to a battery swap apparatus and a battery swap system for replacing a battery of an electrical device, which comprises: a movable base configured to drive the battery swap apparatus to move; two battery swap mechanisms arranged on the movable base, the two battery swap mechanisms being configured to carry two batteries so that the battery swap apparatus replaces the two batteries at the same time; and an exchange mechanism arranged on the movable base, the exchange mechanism being configured to drive the two battery swap mechanisms to exchange positions. The battery swap apparatus provided by the present application can replace two batteries at the same time, the number of times of traveling in the battery swap process is small, and the battery swap efficiency is high, which solves the problem of low battery swap efficiency at present.

8 Claims, 12 Drawing Sheets

(58) Field of Classification Search
CPC .......... B60L 58/18; B60L 53/80; Y02T 10/70;
Y02T 10/7072
See application file for complete search history.

(56) References Cited

FOREIGN PATENT DOCUMENTS

| | | | | | |
|---|---|---|---|---|---|
| CN | 102267437 | A | | 12/2011 | |
| CN | 204730868 | U | | 10/2015 | |
| CN | 106586017 | A | | 4/2017 | |
| CN | 208855603 | U | | 5/2019 | |
| CN | 110077774 | A | | 8/2019 | |
| CN | 110371087 | A | | 10/2019 | |
| CN | 110696782 | A | | 1/2020 | |
| CN | 111452666 | A | | 7/2020 | |
| CN | 111823941 | A | | 10/2020 | |
| CN | 211684744 | U | | 10/2020 | |
| CN | 212219957 | U | | 12/2020 | |
| CN | 112357486 | A | | 2/2021 | |
| CN | 113386616 | A | | 9/2021 | |
| DE | 102006016801 | A1 | | 10/2007 | |
| EP | 3725605 | A1 | | 10/2020 | |
| EP | 4442494 | A1 | * | 10/2024 | .............. B60L 53/80 |
| JP | 2008520173 | A | | 6/2008 | |
| KR | 10-2254921 | B1 | | 5/2021 | |
| WO | 2016001719 | A1 | | 1/2016 | |
| WO | WO-2020034638 | A1 | * | 2/2020 | ............... B66F 7/28 |
| WO | WO-2023193628 | A1 | * | 10/2023 | .............. B60L 53/80 |
| WO | WO-2024036997 | A1 | * | 2/2024 | ................ B60S 5/06 |
| WO | WO-2024061022 | A1 | * | 3/2024 | ................ B60S 5/06 |
| WO | WO-2025086574 | A1 | * | 5/2025 | .............. B60L 53/80 |

OTHER PUBLICATIONS

Written Opinion issued May 11, 2022 in International Patent Application No. PCT/CN2021/119640 with English translation thereof.

Extended European Search Report issued Dec. 22, 2023 in European Patent Application No. 21956966.2.

Shang Jack, "Our lithium battery for electric bus", May 5, 2013, YouTube Video retrieved from the Internet: URL: https://www.youtube.com/watch?v=RpVzj97i-gk [retrieved on Feb. 14, 2019], 0mn49s-2mn50s. (See the attached European Search Report of Dec. 22, 2023 as a Written Concise Explanation of Relevance.).

Zhuo Jia, "EV using battery swap at 2008 Olympic Games", Apr. 19, 2012, YouTube Video retrieved from the Internet: URL: https://www.youtube.com/watch?v=9lv01nLWGU [retrieved on Feb. 14, 2019], the whole video. (See the attached European Search Report of Dec. 22, 2023 as a Written Concise Explanation of Relevance.).

Huang Angelo, "e-station: battery swapping for bus", Nov. 12, 2015, YouTube Video retrieved from the Internet: URL: https://www.youtube.com/watch?v=FQVx167iYS4 [retrieved on Dec. 5, 2023], the whole video. (See the attached European Search Report of Dec. 22, 2023 as a Written Concise Explanation of Relevance.).

Sun Mobility, "Sun Mobility Bus QIS battery swap Video", Apr. 25, 2018, YouTube Video retrieved from the Internet: URL: https://www.youtube.com/watch?v=hWIAf6P61LE [retrieved on Dec. 5, 2023], 10s-42s. (See the attached European Search Report of Dec. 22, 2023 as a Written Concise Explanation of Relevance.).

Notice of Reasons for Refusal issued Feb. 13, 2024 in Japanese Patent Application No. 2023-518778 with English translation thereof.

Office Action issued Mar. 7, 2026 in Chinese Patent Application No. 20218091867.0 with English translation thereof.

* cited by examiner

1000

BATTERY SWAP APPARATUS AND BATTERY SWAP SYSTEM

CROSS-REFERENCE TO RELATED APPLICATION

This application is a continuation application of PCT Patent Application No. PCT/CN2021/119640, entitled "BATTERY SWAP APPARATUS AND BATTERY SWAP SYSTEM" filed on Sep. 22, 2021, which is incorporated herein by reference in its entirety.

TECHNICAL FIELD

The present application relates to the technical field of battery swap of an electrical device, and specifically, to a battery swap apparatus and a battery swap system.

BACKGROUND ART

With the development of new energy technology, the number of apparatus using batteries has increased. When an electric energy of the electrical device is exhausted, the electric energy is often supplemented by connecting to a charging device. At the same time, there is also a way to quickly supplement electric energy by replacing the battery. Usually, a special apparatus (referred to as a battery swap apparatus) is required to replace the battery. The existing battery swap apparatus is inconvenient to operate and has low replacement efficiency.

SUMMARY OF THE INVENTION

The present application aims to provide a battery swap apparatus and a battery swap system to solve the problem of low battery swap efficiency in the prior art.

The embodiments of the present application are implemented as follows:

in a first aspect, an embodiment of the present application provides a battery swap apparatus for replacing a battery of an electrical device, including:

a movable base configured to drive the battery swap apparatus to move;

two battery swap mechanisms arranged on the movable base, the two battery swap mechanisms being configured to carry two batteries so that the battery swap apparatus replaces the two batteries at the same time;

an exchange mechanism arranged on the movable base, the exchange mechanism being configured to drive the two battery swap mechanisms to exchange positions.

When the battery swap apparatus is moved to the electrical device, the exchange mechanism drives the two battery swap mechanisms to correspond to the battery mounting positions of the electrical device respectively, so that the two battery swap mechanisms remove and mount the batteries to the battery mounting positions of the electrical device respectively, and further, the electrical device realizes replacement of the battery; when the battery swap apparatus moves to a battery picking-and-placing apparatus, the exchange mechanism drives the two battery swap mechanisms to exchange positions, so that the two battery swap mechanisms are successively close to the battery picking-and-placing apparatus, so that a fork of the battery picking-and-placing apparatus picks up or places the battery on the two battery swap mechanisms one after the other. Through the above solution, the battery swap apparatus provided by the present application can replace two batteries at the same time by two round trips between the electrical device and the battery picking-and-placing apparatus, while the existing battery swap apparatus cannot realize the simultaneous replacement of two batteries. The existing battery swap apparatus needs at least three round trips to complete the replacement of two batteries. Since the present application meets the requirement of simultaneously replacing two batteries, the number of round trips is reduced compared with the prior art, the battery swap efficiency is improved, and the problem of low battery swap efficiency is solved.

In addition, when only one battery pack needs to be replaced, in the prior art, at least two round trips are required to complete the replacement of one battery, while the battery swap apparatus of the present application uses one battery swap mechanism to remove the battery from the battery mounting position of the electrical device, and use another battery swap mechanism to mount the battery on the battery mounting position of the electrical device. Since the two battery swap mechanisms can exchange positions, there is no problem that the battery cannot be picked up and placed in cooperation with the battery picking-and-placing apparatus, therefore, the battery can be replaced with one round trip. In this way, the battery swap efficiency is improved, and the problem of low battery swap efficiency is solved.

In an embodiment of the present application, the exchange mechanism includes a driving member and a rotating base, the driving member is configured to drive the rotating base to rotate, and the two battery swap mechanisms are mounted on the rotating base and are symmetrically arranged about a rotation axis of the rotating base.

In the above solution, the positions of the two battery swap mechanisms are exchanged by rotating, and the two battery swap mechanisms are symmetrically arranged about the rotation axis of the rotating base. After the rotating base is rotated by 180°, the two battery swap mechanisms are in each other's positions, and the exchange operation is simple and convenient, and it is convenient for the battery picking-and-placing apparatus to pick and place the battery. In addition, when arrangement directions of the battery mounting positions of the electrical device are different, the position of the battery swap mechanism can be changed by rotating the rotating base. This solution is suitable for a variety of electrical devices with different arrangement directions of battery mounting positions, and has wide applicability.

In an embodiment of the present application, the driving member is fixed to the movable base, the exchange mechanism further includes a first gear and a second gear that mesh with each other, the first gear is mounted on an output end of the driving member, and the second gear is fixed on the rotating base.

In the above technical solution, rotation is realized by a gear set driven on the same plane, the distance between rotating base and the movable base is small, the overall structure of the battery swap apparatus is compact, its center of gravity is low, the movement is stable and the passability is good.

In an embodiment of the present application, the two battery swap mechanisms are arranged at intervals.

In the above technical solution, the two battery swap mechanisms are arranged at intervals so as not to interfere and affect the replacement of batteries respectively.

In an embodiment of the present application, the battery swap mechanism includes a locking and unlocking assembly and a protective enclosure, the locking and unlocking assembly comprises a base plate and a locking and unlocking unit, the locking and unlocking unit is configured for locking or unlocking the battery, the protective enclosure covers a top of the base plate, and the protective enclosure is provided with a first opening through which the locking and unlocking unit extends.

In the above technical solution, the protective enclosure shields the locking and unlocking assembly to play a protective role, and does not affect normal operation of the locking and unlocking unit.

In an embodiment of the present application, the locking and unlocking assembly further includes a positioning member for positioning the battery and a supporting member for supporting the battery, and the protective enclosure is provided with a second opening through which the positioning member extends and a third opening through which the supporting member extends.

In the above technical solution, the battery is supported by the supporting member to reduce the force of the protective enclosure, the battery is positioned on the locking and unlocking assembly by the positioning member, and the locking and unlocking assembly corresponds to the battery mounting position of the electrical device through the positioning member, thereby determining the mounting position of the battery, and ensuring that the battery corresponds to the battery mounting position of the electrical device.

In an embodiment of the present application, a side of the protective enclosure away from the locking and unlocking assembly is provided with a slot, and the slot is configured for insertion of a fork to pick and place the battery.

In the above technical solution, the fork is below a bottom surface of the battery when the fork is in the slot, and the battery can be picked up by lifting the fork upward. By setting the slot, the fork is prevented from rubbing on the bottom surface of the battery and the battery is prevented from wearing.

In an embodiment of the present application, the battery swap mechanism further includes a lift assembly, and the lift assembly is configured to lift the locking and unlocking assembly.

In the above technical solution, by the lift assembly, the height of the battery swap apparatus can be lowered when moving, so that the overall structure of the battery swap apparatus is more compact, its center of gravity is lower, and the passability of the battery swap apparatus is improved; and when the battery swap apparatus reaches the electrical device, the lift assembly lifts the battery swap mechanism, and the locking and unlocking assembly can be brought close to the electrical device to complete the unlocking and locking of the battery, thereby completing the removing and mounting of the battery.

In an embodiment of the present application, the locking and unlocking assembly is floatingly connected to the lift assembly.

In the above technical solution, since the two locking and unlocking assemblies are arranged floatingly respectively, each of the two locking and unlocking assemblies has a horizontal adjustment margin. When there is a horizontal position error of the locking and unlocking assemblies relative to the electrical device, it ensures that the two batteries correspond to the battery positions of the electrical device.

According to a second aspect, an embodiment of the present application provides a battery swap system, including:

a rail;

a battery swap apparatus as stated above movably arranged on the rail;

a battery swap platform located at one end of the rail; and a battery picking-and-placing apparatus located at the other end of the rail.

In the battery swap system provided by the present application, its battery swap apparatus has two battery swap mechanisms that can exchange positions, so that the two battery swap mechanisms can be successively close to the battery picking-and-placing apparatus, so that the fork of the battery picking-and-placing apparatus can pick up or place the battery successively at the two battery swap mechanisms to meet the needs of replacing two batteries at the same time, and the battery swap efficiency is improved.

DESCRIPTION OF DRAWINGS

To more clearly describe the technical solutions in embodiments of the present application, the drawings to be used in the embodiments of the present application will be briefly introduced below. It should be understood that the following drawings only show some embodiments of the present application, and therefore should not be regarded as a limitation of the scope. For those of ordinary skills in the art, other drawings may also be obtained based on these drawings without making creative work.

Figure 1:
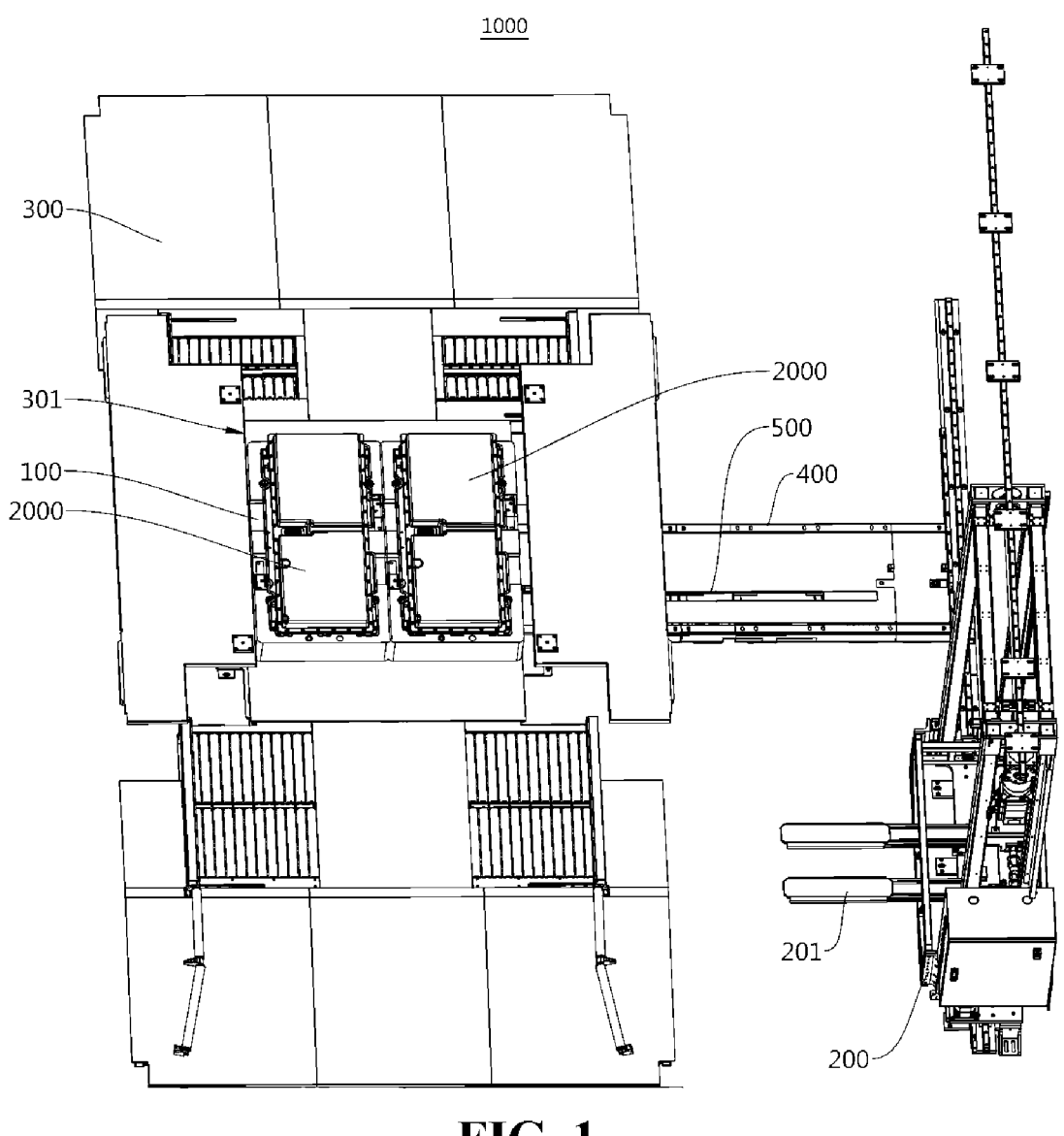
FIG. 1 is a schematic structural view of a battery swap system provided by an embodiment of the present application.

Reference numerals: 1000—battery swap system; 2000—battery; 2001—fastening bolt; 2002—first pin hole; 3000—chassis of vehicle; 3001—movable nut; 100—battery swap apparatus; 200—battery picking-and-placing apparatus; 201—fork; 300—battery swap platform; 301—avoidance opening; 400—rail; 500—rack; 1—movable base; 11—base body; 12—roller; 13—traveling drive mechanism; 131—traveling motor; 132—traveling gear; 14—base; 141—bearing; 2—battery swap mechanism; 21—locking and unlocking assembly; 211—base plate; 2111—supporting column; 2112—chain; 212—locking and unlocking unit; 2121—drive motor; 2122—bolt sleeve; 213—supporting member; 2131—first supporting block; 2132—second supporting block; 2133—elastic member; 214—positioning member; 22—protective enclosure; 221—first opening; 222—second opening; 223—third opening; 224—slot; 23—lift assembly; 231—scissor-type supporting arm; 2311—first supporting rod; 23111—first sliding block; 2312—second supporting rod; 23121—second sliding block; 2313—first bearing seat; 2314—second bearing seat; 231—first sliding rail; 2316—second sliding rail; 232—lift driving member; 2321—lift motor; 2322—lead screw; 2323—nut; 233—mounting seat; 3—exchange mechanism; 31—rotating base; 311—second gear; 32—driving member; 321—first gear; a-rotation axis.

DETAILED DESCRIPTION

Embodiments of the technical solutions of the present application will be described in detail below in conjunction with the drawings. The following embodiments are only used to more clearly illustrate the technical solution of the present application, and therefore are only used as examples and cannot be used to limit the scope of protection of the present application.

Unless otherwise defined, all technical and scientific terms used herein have the same meaning as commonly understood by those skilled in the art belonging to the technical field of the present application; the terms used herein are intended only for the purpose of describing specific embodiments and are not intended to limit the present application; the terms " including" and "having" and any variations thereof in the specification and the claims of the present application and in the description of drawings above are intended to cover non-exclusive inclusion.

In the description of the embodiments of the present application, the technical terms "first", "second", and the like are used only to distinguish between different objects, and are not to be understood as indicating or implying a relative importance or implicitly specifying the number, particular order, or primary and secondary relation of the technical features indicated. In the description of the embodiments of the present application, the meaning of "a plurality of" is two or more, unless otherwise explicitly and specifically defined.

Reference herein to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the description of the embodiments of the present application, the term "and/or" is only an association relationship for describing associated objects, indicating that three relationships may exist. For example, A and/or B may represent three situations: A exists alone, both A and B exist, and B exists alone. In addition, the character "/" herein generally means that the associated objects before and after it are in an "or" relationship.

In the description of the embodiments of the present application, the term "plurality of" refers to two or more (including two), and similarly, "multiple groups" refers to two or more (including two) groups, and "multiple sheets" refers to two or more (including two) sheets.

In the description of the embodiments of the present application, the orientation or location relationships indicated by the technical terms "center", "longitudinal", "transverse", "length", "width", "thickness", "up", "down", "front", "back", "left", "right", "vertical", "horizontal", "top", "bottom", "inside", "outside", "clockwise", "counterclockwise", "axial", " radial", "circumferential" and the like are based on the orientation or location relationships shown in the drawings, and are only for convenience and simplification of the description of the embodiments of the present application, but do not indicate or imply that the referred apparatuses or elements must have particular orientations, be constructed and operated in particular orientations, and therefore cannot be construed as a limitation of the embodiments of the present application.

In the description of the embodiments of the present application, unless otherwise expressly specified and limited, the technical terms "mounting", "connected", "connecting", "fixing", and the like shall be understood in a broad sense, which, for example, may be a fixed connection, or a detachable connection or an integral connection, may also be a mechanical connection, or an electrical connection, may be a direct connection, or an indirect connection through an intermediate medium, and may be a communication within two elements or an interactive relationship between two elements. For those of ordinary skill in the art, the specific meanings of the above terms in the embodiments of the present application can be understood according to specific situations.

With the development of new energy technology, the number of devices using batteries has increased. When an electric energy of the electrical device is exhausted, the electric energy is often supplemented by connecting to a charging device. For example, electric vehicles can be connected to charging piles for charging. Compared with the method of connecting charging device such as charging piles to supplement the electric energy, replacing the battery can realize supplement of the electric energy faster. At present, there is also a battery swap system specially used for replacing the battery, the battery swap system is provided with a battery picking-and-placing apparatus and a movable battery swap apparatus, the battery swap apparatus is configured to replace the battery of the electrical device.

The inventor noticed that in order to improve the range ability, the number of batteries of some electrical devices is increased. For example, some electric vehicles are equipped with two batteries. However, the existing battery swap apparatus can only carry one battery at a time. For the vehicle with two batteries, the battery swap apparatus needs to travel at least three round trips between the vehicle and the battery picking-and-placing apparatus. Moreover, every time moving close to the vehicle, the battery swap apparatus needs to be repositioned before the battery is removed or mounted on the vehicle, so that the battery can be removed and mounted accurately, and the replacement efficiency is low.

In order to improve efficiency, the inventor has considered increasing the number of batteries that the battery swap apparatus carries at one time. However, if the battery swap apparatus carries two batteries, it is easy to cause one of the batteries to be outside the working range of the fork of the battery picking-and-placing apparatus, as a result, the battery picking-and-placing apparatus cannot pick up and recycle two batteries on the battery swap apparatus, nor can it place two batteries on the battery swap apparatus.

In order to alleviate the problem of low battery swap efficiency of the existing battery swap apparatus, the present application provides a solution in which the battery swap apparatus is provided with a movable base, an exchange mechanism and two battery swap mechanisms. The exchange mechanism and two battery swap mechanisms are arranged on the movable base, the two battery swap mechanisms respectively carry one battery, and when the movable base drives the battery swap apparatus to move close to the electrical device, the two battery swap mechanisms are aligned with the battery mounting positions of the electrical device respectively, so as to realize simultaneous removal or simultaneous mounting of two batteries for one positioning, the exchange mechanism is configured to drive the two battery swap mechanisms to exchange positions, so that the two battery swap mechanisms are successively within the working range of the fork of the battery picking-and-placing apparatus, so as to complete the recycle and update of the two batteries. Through the above solution, the battery swap apparatus can replace two batteries at the same time, the number of times the battery swap apparatus travels back and forth is reduced, the number of times the battery swap apparatus is positioned is reduced, and the battery swap efficiency is improved.

It should be noted that the battery mounting position refers to the space formed on the used electrical device for accommodating the battery, for example, the upwardly concave groove formed on the chassis of the vehicle, the groove allows the battery to be located in the groove, and the surface of the battery is roughly flush with the rest portions of the chassis.

The battery swap apparatus and the battery swap system disclosed in the embodiments of this present application can be used, but not limited to, to replace the battery of a vehicle, and can also be used to replace the battery of other electrical devices such as ship and aircraft, such as electric toy, power tool, battery car, electric vehicle, boat, spacecraft, etc. Wherein the electric toy may be fixed or mobile, such as game consoles, electric car toys, electric ship toys, electric airplane toys, and the like. Electric tool may be fixed or mobile, such as electric machine tools, electric sweepers, etc. The spacecraft may include airplanes, rockets, space shuttles, spaceships, and the like.

Hereinafter, the battery swap apparatus and the battery swap system will be described by taking the electrical device as a vehicle as an example.

Referring to FIG. 1, a battery swap system 1000 includes a battery swap apparatus 100 and a battery picking-and-placing apparatus 200.

The battery swap system 1000 further includes a battery charging apparatus (not shown in the figure), and the battery charging apparatus is configured for storing the battery 2000 and charging the battery 2000. The battery picking-and-placing apparatus 200 can be a robot, a stacker, etc. The battery picking-and-placing apparatus 200 is provided with a fork 201 (the fork 201 can also be replaced with a robot arm), and the fork 201 picks up the battery 2000 to be charged on the battery swap apparatus 100 and places it into the battery charging apparatus for recycling, and picks up the fully charged battery 2000 from the battery charging apparatus and places it on the battery swap apparatus 100.

The battery swap apparatus 100 moves between the vehicle and the battery picking-and-placing apparatus 200. The battery swap apparatus 100 removes the battery 2000 to be charged on the vehicle and transports it to the battery picking-and-placing apparatus 200, and mounts the fully charged battery 2000 updated through the battery picking-and-placing apparatus 200 to the vehicle.

When the electrical device is a mobile device, such as a vehicle, the battery swap system 1000 further includes a battery swap platform 300 for parking the vehicle. The battery swap apparatus 100 moves between the battery swap platform 300 and the battery picking-and-placing apparatus 200. The battery swap platform 300 is configured to lift the vehicle as a whole, and the vehicle is located above the battery swap platform 300. The battery swap platform 300 is formed with an avoidance opening 301. The battery mounting position of the vehicle (not shown in the figure) corresponds to the avoidance opening 301. The battery swap apparatus 100 is parked under the avoidance opening 301 for a vehicle. A battery swap mechanism 2 on the battery swap apparatus 100 removes or mounts the battery 2000 through the avoidance opening 301.

The battery swap system 1000 further includes a rail 400, one end of the rail 400 extends to the working range of the fork 201 of the battery picking-and-placing apparatus 200, and the other end of the rail 400 extends to the battery swap platform 300. The battery swap apparatus 100 is provided with a roller 12 and a traveling drive mechanism 13, the roller 12 cooperates with the rail 400, and the traveling drive mechanism 13 drives the roller 12 to roll on the rail 400.

Figures 2, 3:
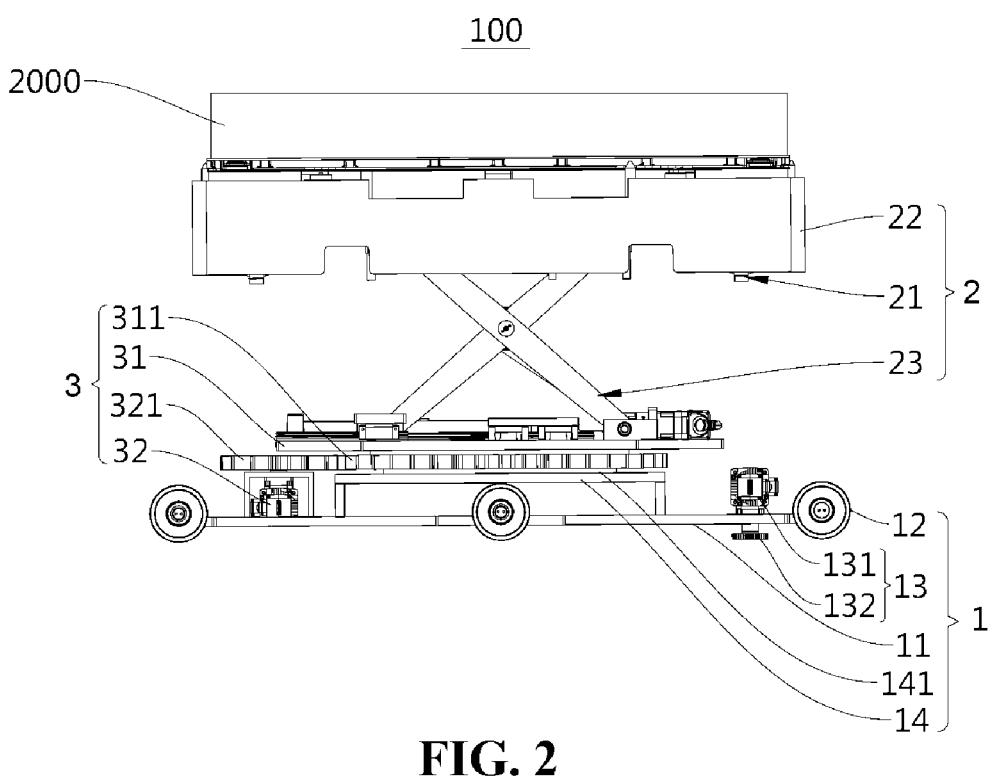
FIG. 2 is a side view of a battery swap apparatus provided by an embodiment of the present application in a state where the battery is carried and lifted.
FIG. 3 is a schematic three-dimensional structural view of a battery swap apparatus provided by an embodiment of the present application in a state where the battery is carried

The traveling drive mechanism 13 may be a drive motor, a hydraulic drive rod, etc. As shown in FIG. 2, in this embodiment, the traveling drive mechanism 13 includes a traveling motor 131 and a traveling gear 132. The traveling motor 131 is mounted on the battery swap apparatus 100, and the traveling gear 132 is arranged at an output end of the traveling motor 131. As shown in FIGS. 1 and 2, the battery swap system 1000 further includes a rack 500, the rack 500 is fixed on the ground and extends along the rail 400, the rack 500 meshes with the traveling gear 132, and when the traveling motor 131 works, the traveling gear 132 is driven to rotate on the rack 500, thereby driving the battery swap apparatus 100 to move.

Figure 4:
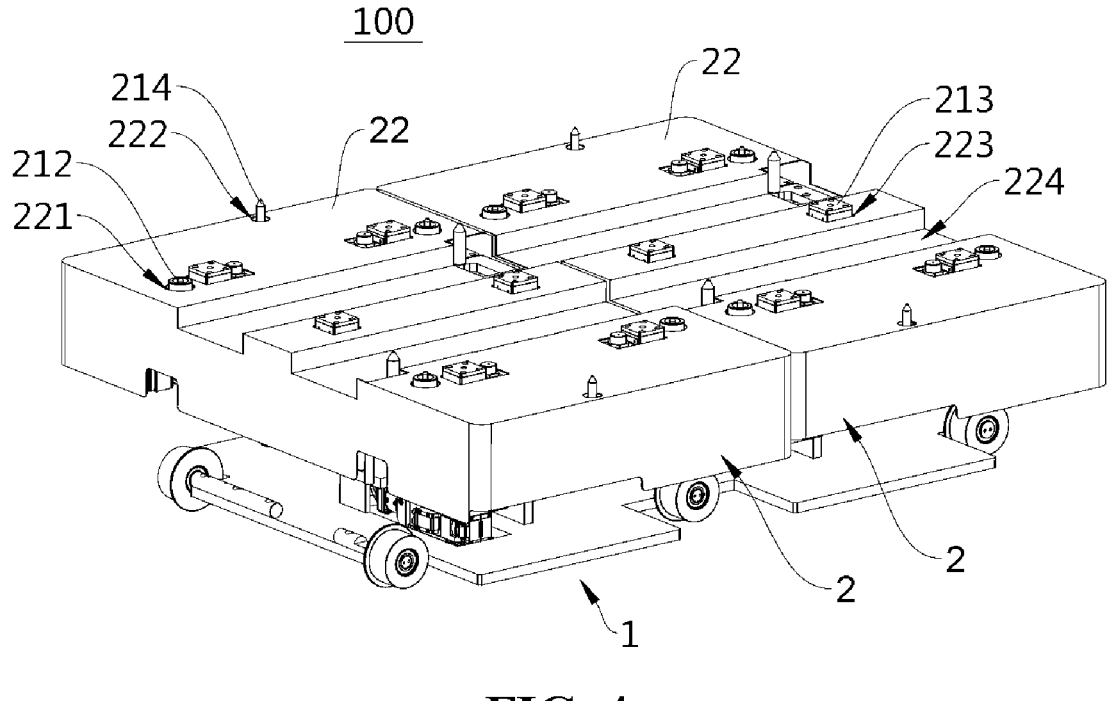
FIG. 4 is a schematic three-dimensional structural view of a battery swap apparatus provided by an embodiment of the present application.
Figure 5:
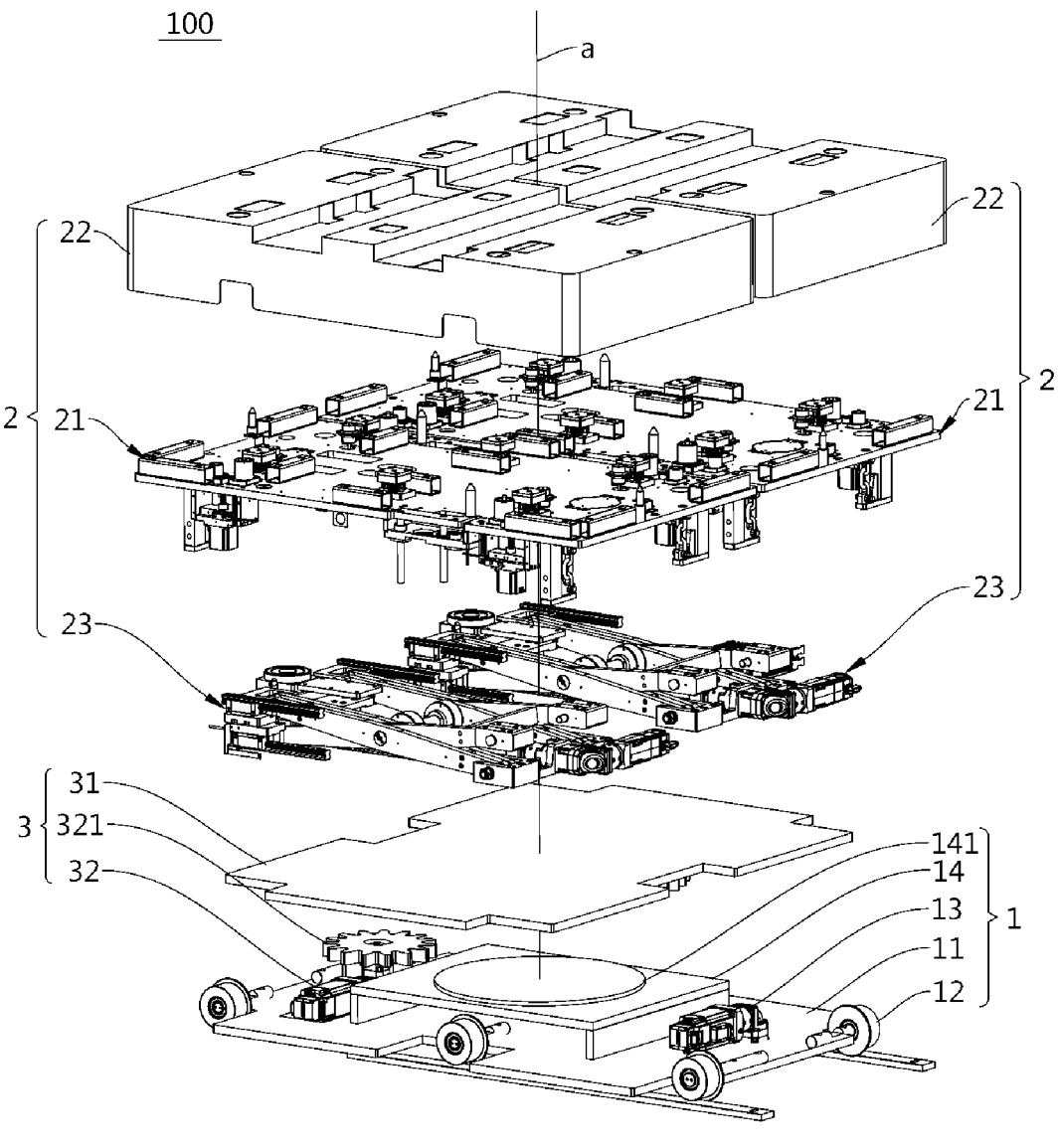
FIG. 5 is a schematic exploded view of a battery swap apparatus provided by an embodiment of the present application.

Referring to FIGS. 3, 4 and 5, the battery swap apparatus 100 includes a movable base 1, an exchange mechanism 3 and two battery swap mechanisms 2. The movable base 1 is configured to drive the battery swap apparatus 100 to move, that is, to mount the aforementioned roller 12 and the traveling drive mechanism 13. The exchange mechanism 3 and the two battery swap mechanisms 2 are arranged on the movable base 1. The two battery swap mechanisms 2 are each configured to carry one battery 2000, so that the battery swap apparatus 100 can simultaneously replace the two batteries 2000. The exchange mechanism 3 is configured to drive the two battery swap mechanisms 2 to exchange positions.

Replacing two batteries 2000 by the battery swap apparatus 100 only requires two round trips between the battery picking-and-placing apparatus 200 and the vehicle. The first round trip: the battery swap apparatus 100 is moved to the bottom of the vehicle without load, the two battery swap mechanisms 2 are positioned at the same time, and remove the two batteries 2000 to be charged on the vehicle. Then, the battery swap apparatus 100 carries two batteries 2000 to be charged and moves to be close to the battery picking-and-placing apparatus 200, so that one battery swap mechanism 2 is first within the working range of the fork 201 of the battery picking-and-placing apparatus 200, and the battery picking-and-placing apparatus 200 picks up the battery 2000 to be charged at the battery swap mechanism 2 and places the fully charged battery 2000, and then the exchange mechanism 3 drives the two battery swap mechanisms 2 to exchange positions, so that the other battery swap mechanism 2 is within the working range of the fork 201 of the battery picking-and-placing apparatus 200, the battery picking-and-placing apparatus 200 repeats the action to pick up the battery 2000 to be charged on another battery swap mechanism 2 and places the fully charged battery 2000. The second round trip: the battery swap apparatus 100 carries two fully charged batteries 2000 and moves to the bottom of the vehicle, the two battery swap mechanisms 2 are positioned at the same time, and mount the two fully charged batteries 2000 in the battery mounting positions of the vehicle, and then the battery swap apparatus returns to the original position without load and wait for the next work.

Replacing two batteries with the existing battery swap apparatus requires at least three round trips. The existing battery swap apparatus needs to be positioned at the bottom of the vehicle before removing and mounting the battery. During the entire battery swap process, the existing battery swap apparatus needs to be positioned at the bottom of the vehicle four times, only one battery can be replaced at a time. Compared with the existing battery swap apparatus, the battery swap apparatus 100 provided in this embodiment can replace two batteries 2000 at the same time, which reduces the number of round trips, and reduces the number of times that the battery swap apparatus 100 is positioned at the bottom of the vehicle, and removing work of the two batteries 2000 is carried out synchronously, and the mounting work of the two batteries 2000 is carried out synchronously, which effectively improves the battery swap efficiency and solves the problem of low battery swap efficiency.

The battery swap apparatus 100 provided in this embodiment can not only be configured to replace two batteries 2000 at the same time, but also can improve the battery swap efficiency when replacing the battery for a vehicle carrying one battery 2000. One battery swap mechanism 2 of the battery swap apparatus 100 is unloaded, and the other battery swap mechanism 2 carries a fully charged battery 2000 and moves to the bottom of the vehicle. The unloaded battery swap mechanism 2 first locates and removes the battery 2000 to be charged, and then the exchange mechanism 3 drives the two battery swap mechanisms 2 to exchange positions, so that the other battery swap mechanism 2 carrying the fully charged battery 2000 is positioned, and the fully charged battery 2000 is mounted in the vehicle, and then the battery swap apparatus 100 carries the battery 2000 to be charged to move to the battery picking-and-placing apparatus 200. The existing battery swap apparatus requires at least two round trips, but this embodiment only requires one round trip, which effectively improves the battery swap efficiency and solves the problem of low battery swap efficiency. In addition, since the two battery swap mechanisms 2 can be exchanged in positions, as long as the unloaded battery swap mechanism 2 is positioned accurately, the battery swap mechanism 2 carrying the fully charged battery 2000 can be positioned accurately by directly exchanging positions via the battery swap mechanism 3, so the difficulty of positioning is reduced, the positioning speed is accelerated, and the battery swap efficiency is improved.

As shown in FIG. 5, the exchange mechanism 3 includes a driving member 32 and a rotating base 31. The driving member 32 is configured to drive the rotating base 31 to rotate on the movable base 1, and the two battery swap mechanisms 2 are mounted on the rotating base 31. When the rotating base 31 rotates, the two battery swap mechanisms 2 realize position exchange. FIG. 5 shows a rotation axis a of the rotating base 31, and the two battery swap mechanisms 2 are symmetrically arranged about the rotation axis a of the rotating base 31.

Figures 6, 7, 8:
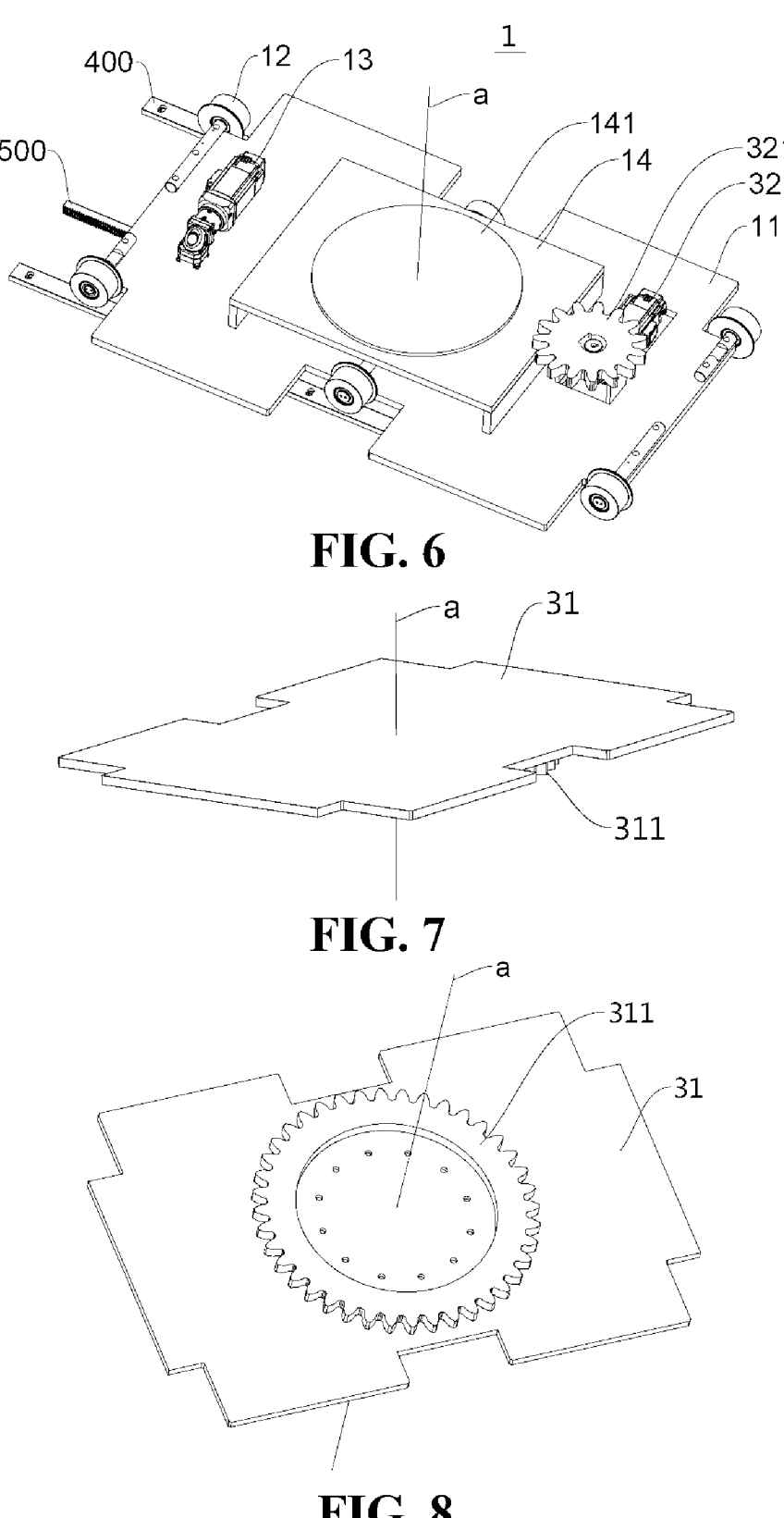
FIG. 6 is a schematic structural view of a movable base provided by an embodiment of the present application.
FIG. 7 is a schematic view of an upper surface of a rotating base provided by an embodiment of the present application.
FIG. 8 is a schematic view of a lower surface of a rotating base provided by an embodiment of the present application.

As shown in FIGS. 5 and 6, one side of the rotating base 31 is connected to the movable base 1, the other side of the rotating base 31 is configured to mount two battery swap mechanisms 2, the rotation axis a of the rotating base 31 is perpendicular to the horizontal plane, and when the rotating base 31 rotates, the positions of the two battery swap mechanisms 2 are changed.

Due to the symmetry of the two battery swap mechanisms 2 about the rotating base 31, the rotating base 31 is rotated horizontally by 180°, and the two battery swap mechanisms 2 exchange positions, that is, the two battery swap mechanisms 2 are at each other's positions, thus, the exchange method is simple and convenient.

In existing vehicles, a length direction of the battery mounting positions of some vehicles is perpendicular to a length direction of the vehicle body (that is, arranged transversely), and the length direction of the battery mounting positions of some vehicles is along the length direction of the vehicle body (that is, arranged longitudinally). In the battery swap apparatus 100 provided by the embodiment, when its rotating base 31 is rotated by 90°, the batteries 2000 carried by the two battery swap mechanisms 2 can be switched to the corresponding transverse or longitudinal directions. If the battery mounting positions of the vehicle are arranged in other directions relative to the vehicle body, the rotation angle of the rotating base 31 can be adjusted to other angles. Therefore, no matter how the battery mounting positions of the vehicle are arranged, the two battery swap mechanisms 2 and the batteries 2000 they carry can be driven to correspond to the arrangement directions of the battery mounting positions of the vehicle body by driving the rotating base 31 to rotate at an appropriate angle by the driving member 32, the battery swap apparatus 100 provided in this embodiment can not only improve the battery swap efficiency, but also has wider applicability.

In other embodiments of the present application, other ways can also be used to exchange the positions of the two battery swap mechanisms 2. For example, the exchange mechanism 3 includes a conveyor belt and a rocker, the conveyor belt is mounted on the movable base 1, and the two battery swap mechanisms 2 are located on the conveyor belt and arranged along the moving direction of the conveyor belt. For the convenience of description, the two battery swap mechanisms 2 are called the first battery swap mechanism 2 and the second battery swap mechanism 2 respectively. One end of the rocker is connected to the movable base 1, and the other end thereof is connected to the first battery swap mechanism 2, when the rocker swings, the first battery swap mechanism 2 is lifted and disengaged from the conveyor belt to make room, so that the conveyor belt drives the second battery swap mechanism 2 to move to the position of the first battery swap mechanism 2, and then the rocker continues to swing to place the first battery swap mechanism 2 at the position of the second battery swap mechanism 2.

As shown in FIGS. 6, 7 and 8, the driving member 32 is fixed to the movable base 1, the exchange mechanism 3 further includes a first gear 321 and a second gear 311 that mesh with each other, the first gear 321 is mounted on an output end of the driving member 32, and the second gear 311 is fixed on the rotating base 31.

As shown in FIG. 6, the movable base 1 includes a base body 11 and a base 14, the base 14 is arranged on the base body 11, and the base 14 is provided with a bearing 141. The aforementioned roller 12 and the traveling drive mechanism 13 are all mounted on the base body 11, the driving member 32 is a servo motor mounted on the base body 11, and an output end of the servo motor is connected to a rotating shaft of the first gear 321 to drive the first gear 321 to rotate. The second gear 311 is fixed on the side of the rotating base 31 close to the movable base 1, the second gear 311 is connected to the bearing 141, and the second gear 311 meshes with the first gear 321. In this way, if the driving member 32 drives the first gear 321 to rotate, the second gear 311 will rotate therewith and drive the rotating base 31.

Since the first gear 321 and the second gear 311 are arranged on the same plane, a distance between the rotating base 31 and the movable base 1 is small, the overall structure of the battery swap apparatus 100 is compact, its center of gravity is low, the movement thereof is stable, and the passability is good, so that the battery swap apparatus is easy to move to the bottom of the vehicle.

Optionally, an output shaft of the servo motor extends in a horizontal direction, the rotating shaft of the first gear 321 extends in a vertical direction, and the output shaft of the servo motor and the rotating shaft of the first gear 321 are driven by a bevel gear set to further reduce the vertical space occupied.

In some embodiments, the driving member 32 may also be other driving assemblies. For example, the driving member 32 includes a cylinder and a rack 500, the rack 500 meshes with the first gear 321, and the rack 500 is connected to an output end of the cylinder. The output end of the cylinder drives the rack 500 to move to drive the first gear 321 to rotate.

Figures 9, 10:
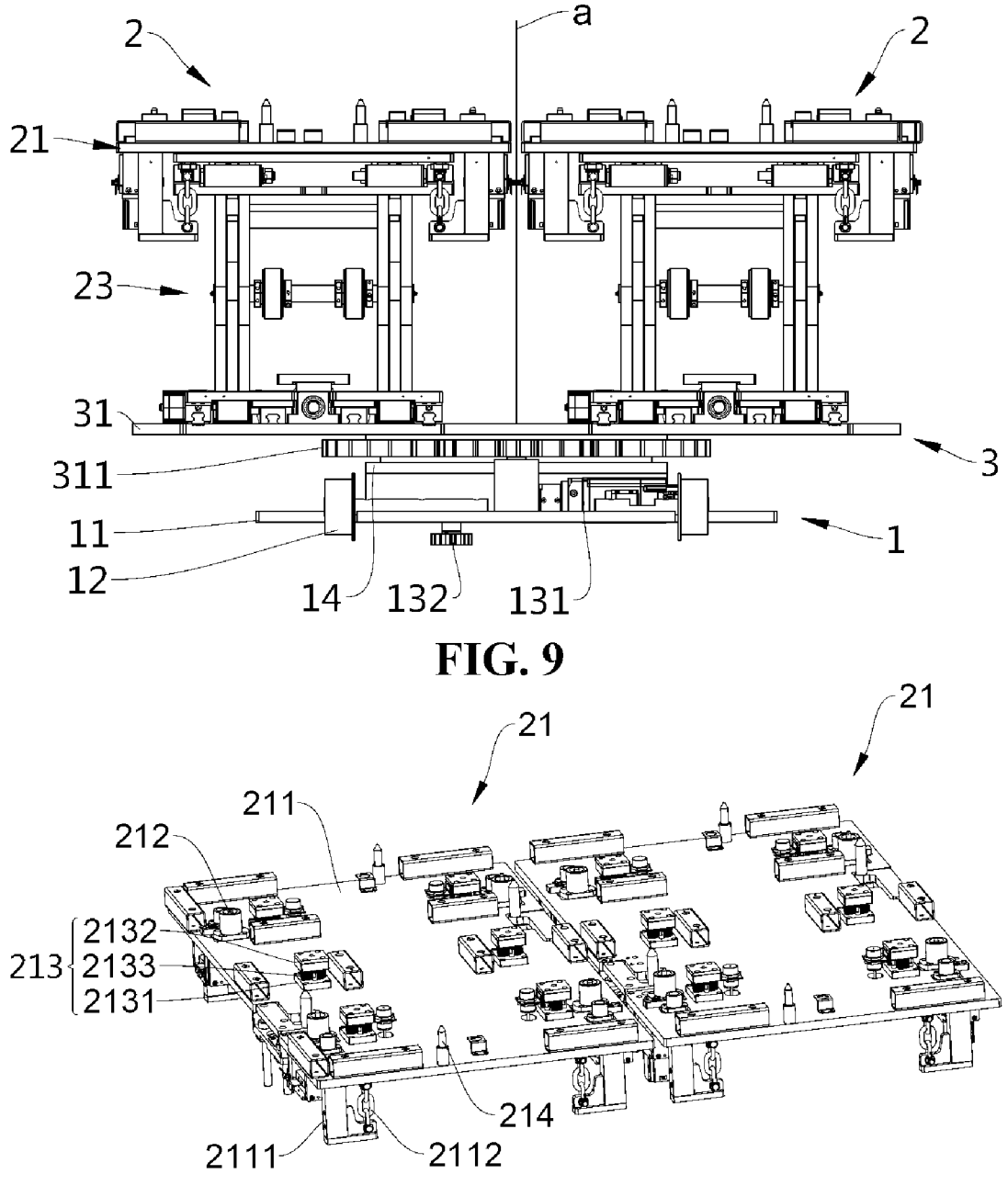
FIG. 9 is a schematic structural view of a battery swap apparatus with a protective enclosure hidden provided by an embodiment of the present application.
FIG. 10 is a schematic structural view of a locking and unlocking assembly of a battery swap mechanism provided by an embodiment of the present application.

In some embodiments, as shown in FIG. 9, the two battery swap mechanisms 2 are arranged at intervals, that is, there is a certain spacing distance between the two battery swap mechanisms 2. The spacing distance can prevent the two battery swap mechanisms 2 from interfering with each other, and prevent the two batteries 2000 carried by the two battery swap mechanisms 2 from interfering, ensuring that the two battery swap mechanisms 2 can replace the batteries 2000 independently.

Referring to FIGS. 4, 5, 10 and 11, the battery swap mechanism 2 includes a locking and unlocking assembly 21. The locking and unlocking assembly 21 includes a base plate 211 and a locking and unlocking unit 212. The locking and unlocking unit 212 is mounted on the base plate 211 The battery swap mechanism 2 further includes a protective enclosure 22, the protective enclosure 22 covers a top of the base plate 211, the protective enclosure 22 is provided with a first opening 221, and the first opening 221 is configured for the locking and unlocking unit 212 to extend out, so that the locking and unlocking unit 212 can lock or unlock the battery 2000, thereby fixing the battery 2000 to the battery mounting position of the vehicle, or removing the battery 2000 from the battery mounting position of the vehicle.

Figures 11, 12:
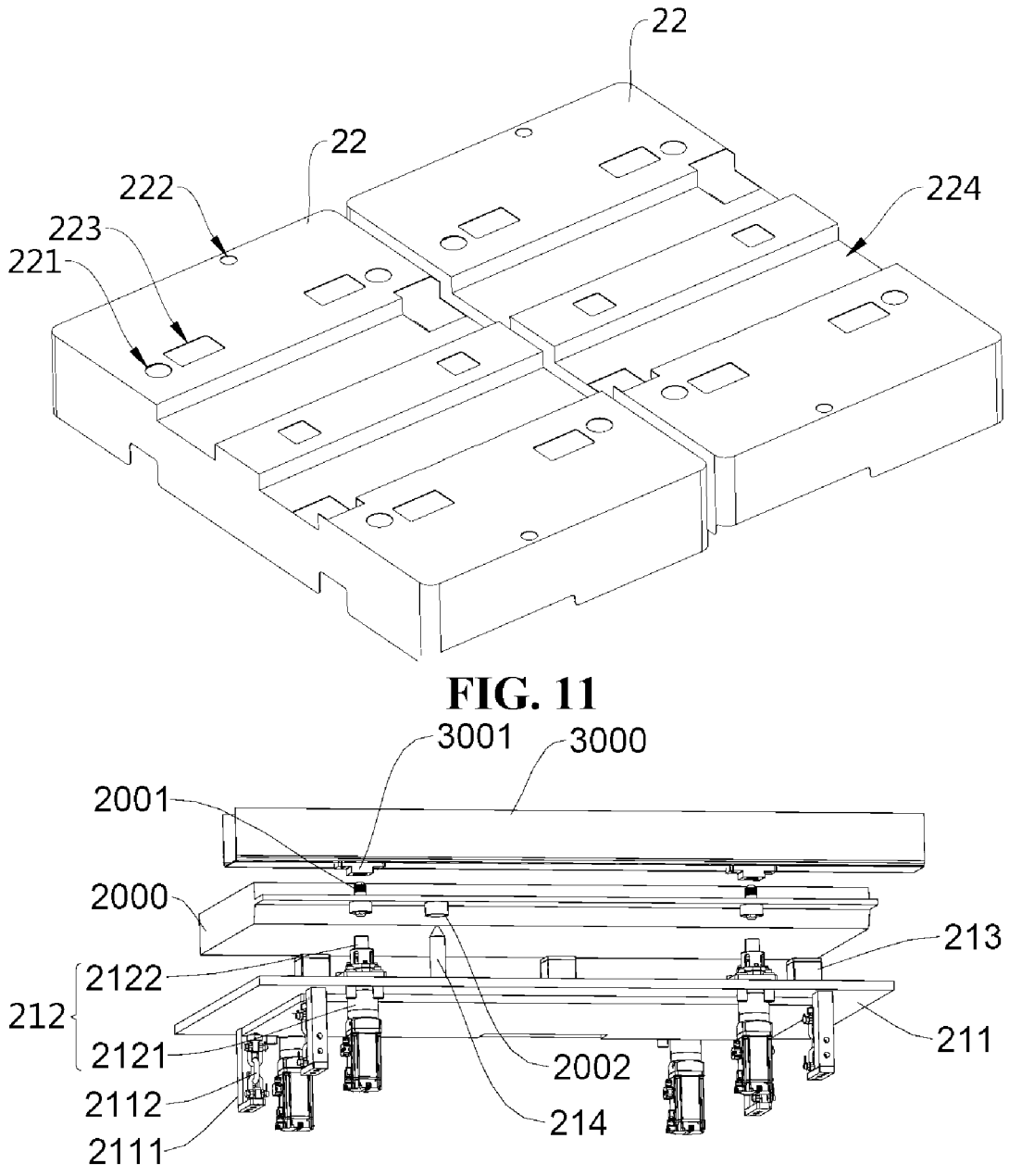
FIG. 11 is a schematic structural view of a protective enclosure provided by an embodiment of the present application.
FIG. 12 is a schematic view of unlocking principle of a locking and unlocking assembly provided by an embodiment of the present application.

As shown in FIG. 12, the battery 2000 is generally provided with a fastening bolt 2001, and the vehicle chassis is provided with a movable nut 3001. The fastening bolt 2001 is in screw-thread fit with the movable nut 3001, and the locking and unlocking unit 212 is configured to screw the fastening bolt 2001 into the movable nut 3001 to fix and mount the battery 2000 at the battery mounting position, and to screw the fastening bolt 2001 out of the movable nut 3001 to remove the battery 2000. For example, the locking and unlocking unit 212 includes a locking and unlocking drive motor 2121 and a bolt sleeve 2122. One end of the bolt sleeve 2122 is connected to an output end of the locking and unlocking drive motor 2121, and the other end of the bolt sleeve 2122 is matched with the fastening bolt 2001. The locking and unlocking drive motor 2121 drives the bolt sleeve 2122 to rotate forward or reverse, so as to drive the fastening bolt 2001 to be screwed into or out of the movable nut 3001. In other embodiments, the locking and unlocking unit 212 may also adopt other ways of locking and unlocking the battery 2000.

The protective enclosure 22 covers an outside of the locking and unlocking assembly 21 to protect the locking and unlocking assembly 21. For example, when the fork 201 of the stacker picks up and places the battery 2000 on the battery swap mechanism 2, the protective enclosure 22 prevents the fork 201 from directly colliding with the locking and unlocking assembly 21 to avoid damage to the locking and unlocking assembly 21, and the protective enclosure 22 does not affect the locking and unlocking unit 212 to lock or unlock the battery 2000.

As shown in FIGS. 4, 10 and 11, the locking and unlocking assembly 21 further includes a positioning member 214 and a supporting member 213. The positioning member 214 and the supporting member 213 are both mounted on the base plate 211, and the protective enclosure 22 is provided with a second opening 222 and a three opening 223, the positioning member 214 extends from the second opening 222, and the supporting member 213 extends from the third opening 223. The positioning member 214 is configured for positioning the battery 2000, and the supporting member 213 is configured for supporting the battery 2000.

As shown in FIG. 4, each battery swap mechanism 2 has a plurality of supporting members 213, and the plurality of supporting members 213 jointly support one battery 2000. Each battery 2000 is placed on the battery swap mechanism 2 by means of multi-point support to ensure that the battery 2000 is placed stably. Under the action of the supporting member 213, the force of the protective enclosure 22 is reduced and is not easily damaged.

As shown in FIG. 12, an outer periphery of the battery 2000 is provided with a first pin hole 2002, and the positioning member 214 is inserted through the first pin hole 2002 to position the battery 2000 relative to the locking and unlocking assembly 21. Optionally, a chassis 3000 of the vehicle is provided with a second pin hole (not shown in the figure), and the positioning member 214 passes through the first pin hole 2002 and enters the second pin hole to position the battery 2000 on the chassis 3000 of the vehicle. The positioning member 214 is configured as a pin, an end of the pin is formed as a cone, and an outer periphery of the cone forms a slope to facilitate guiding the pin into the first pin hole 2002 and the second pin hole, thereby reducing the difficulty of positioning.

Under cooperation of the positioning member 214 and the supporting member 213, the locking and unlocking assembly 21, the battery 2000 and the chassis 3000 of the vehicle are positioned to ensure that the battery 2000 corresponds to the battery mounting position on the chassis 3000 of the vehicle.

Optionally, the supporting member 213 includes a first supporting block 2131, a second supporting block 2132 and an elastic member 2133, and the elastic member 2133 is connected between the first supporting block 2131 and the second supporting block 2132. The first supporting block 2131 is fixedly connected to the base plate 211, the elastic member 2133 supports the second supporting block 2132 to elastically extend from the third opening 223 of the protective enclosure 22, and the second supporting block 2132 contacts a bottom surface of the battery 2000.

The supporting member 213 enables the battery 2000 and the locking and unlocking unit 212 to have a vertical movement margin. When subject to an external force, the supporting member 213 is compressed, the battery 2000 is close to the locking and unlocking unit 212, and the locking and unlocking unit 212 cooperates with the fastening bolt 2001 of the battery 2000; and when the external force disappears, the supporting member 213 recovers from the deform, the battery 2000 is relatively away from the locking and unlocking unit 212, and the locking and unlocking unit 212 is disengaged from the fastening bolt 2001. Under the action of the supporting member 213, it is convenient to control locking and unlocking of the battery 2000, and also avoid the interference between the locking and unlocking unit 212 and the battery 2000, so that the battery 2000 can be easily removed from or placed into the battery swap mechanism 2.

In order to further protect the locking and unlocking assembly 21 and the battery 2000, as shown in FIG. 11, the protective enclosure 22 is further provided with a slot 224. The slot 224 is located on a side of the protective enclosure 22 away from the locking and unlocking assembly 21. The slot 224 is configured for insertion of the fork 201 to pick and place the battery 2000.

The fork 201 of the stacker has two arms (referring to FIG. 1). As shown in FIG. 11, two parallel and spaced slots 224 are formed on each protective enclosure 22. When the battery swap mechanism 2 carries the battery 2000, the slots 224 are located below the battery 2000 (referring to FIG. 3), and both ends of each slot 224 are open to allow the two arms of the fork 201 to enter horizontally from the ends of the two slots 224 respectively, so that the two arms are located at the bottom of the battery 2000, and the two arms are raised to lift the battery 2000 from the battery swap mechanism 2, so as to pick up the battery 2000. When the battery 2000 needs to be placed on the battery swap mechanism 2, the two arms are lowered first so that the battery 2000 contacts the supporting member 213. At this time, the two arms fall into the two slots 224 respectively, then the two arms move horizontally out of the two slots 224, and the battery picking-and-placing apparatus 200 completes the action of placing the fully charged battery 2000 in the battery swap mechanism 2.

By arranging the slot 224, it is convenient for the fork 201 to pick and place the battery 2000. Further, the fork 201 is lowered to be lower than the bottom surface of the battery 2000 first, and then moves horizontally to enter or exit the slot 224. The fork 201 does not contact the bottom surface of the battery 2000 during the horizontal movement, and will not wear the battery 2000.

The battery swap mechanism 2 further includes a lift assembly 23, and the lift assembly 23 is configured to lift the locking and unlocking assembly 21.

Figure 13:
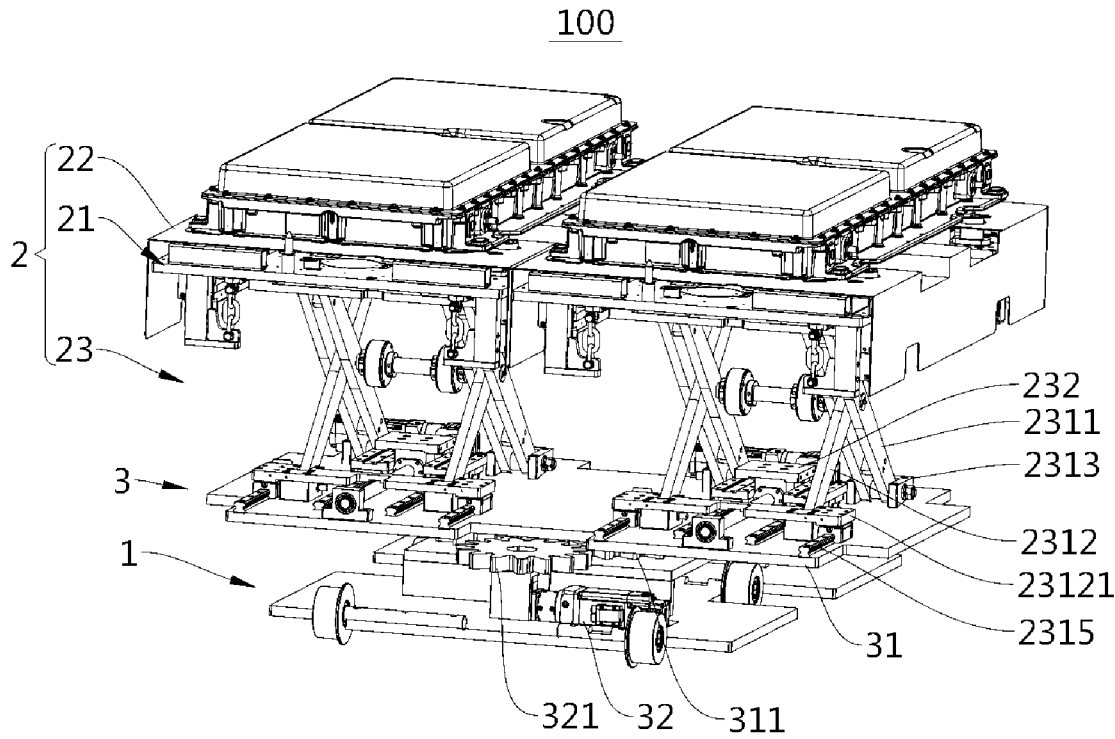
FIG. 13 is a lifting state diagram of a lift assembly of a battery swap apparatus provided by an embodiment of the present application.
Figures 14, 15:
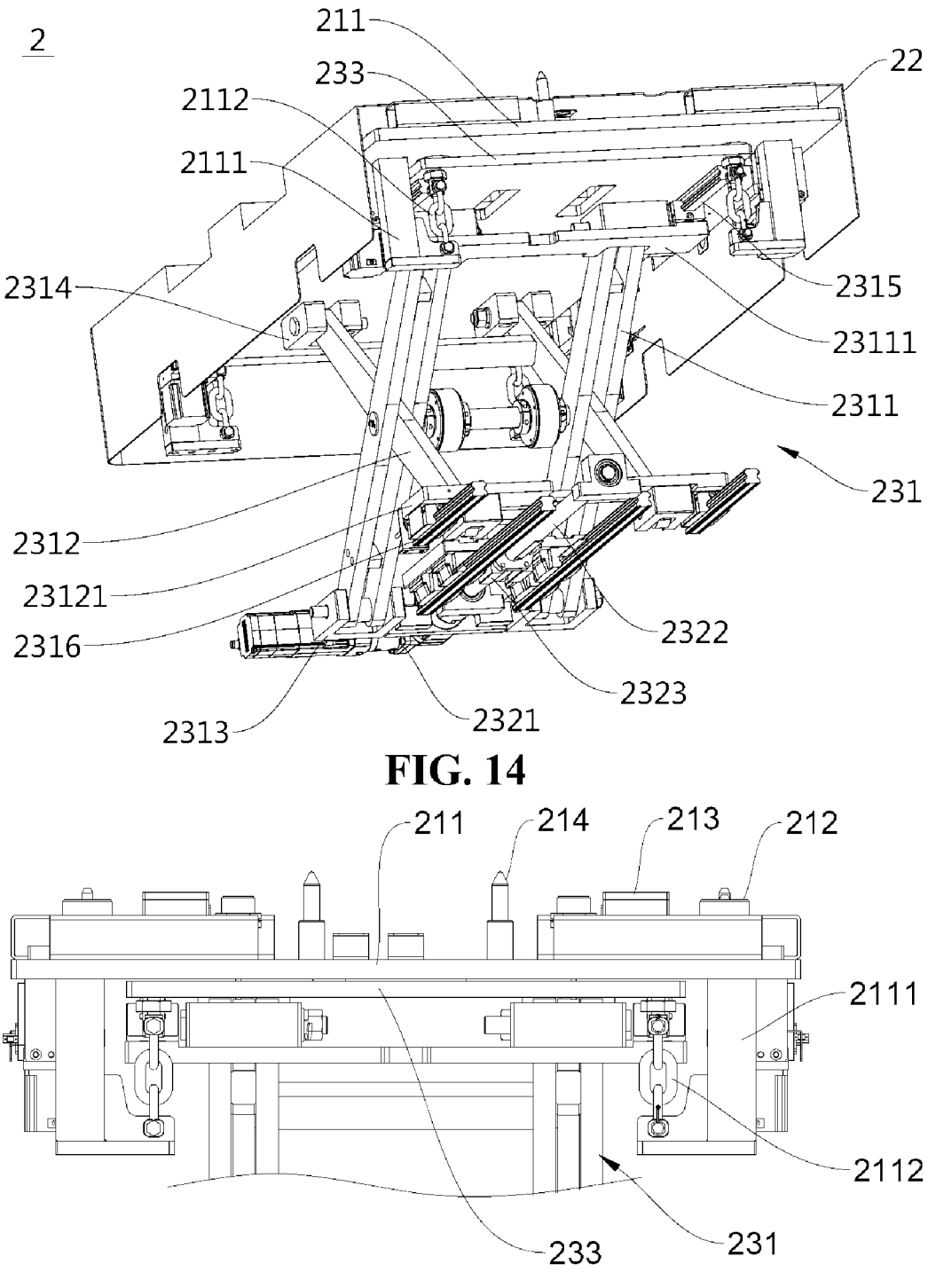
FIG. 14 is a schematic structural view of a scissor-type supporting arm provided by an embodiment of the present application.
FIG. 15 is a schematic view of connection structure between a lift assembly and a locking and unlocking assembly provided by an embodiment of the present application.

As shown in FIGS. 13 and 14, the lift assembly 23 includes a scissor-type supporting arm 231, a lift driving member 232 and a mounting seat 233. The locking and unlocking assembly 21 is mounted on the mounting seat 233, an upper end of the scissor-type supporting arm 231 is connected to the mounting seat 233, a lower end of the scissor-type supporting arm 231 is connected to the rotating base 31, and the lift driving member 232 is configured to drive the scissor-type supporting arm 231 to lift and lower, so as to drive the locking and unlocking assembly 21 on the mounting seat 233 to rise and fall.

The scissor-type supporting arm 231 includes a first supporting rod 2311, a second supporting rod 2312, a first bearing seat 2313, a second bearing seat 2314, a first sliding rail 2315 and a second sliding rail 2316. The middle portions of the first supporting rod 2311 and the second supporting rod 2312 are connected by a rotating shaft; one end of the first supporting rod 2311 is connected to the first bearing seat 2313, and the other end of the first supporting rod 2311 is provided with a first sliding block 23111. The first sliding block 23111 is slidably connected to the first sliding rail 2315; one end of the second supporting rod 2312 is connected to the second bearing seat 2314, the other end of the second supporting rod 2312 is provided with a second sliding block 23121, and the second sliding block 23121 is slidably connected to the second sliding rail 2316. The first bearing seat 2313 and the second sliding rail 2316 are fixed to the rotating base 31, and the second bearing seat 2314 and the first sliding rail 2315 are fixed to the mounting seat 233.

The lift driving member 232 includes a lift motor 2321, a lead screw 2322 and a nut 2323. The lift motor 2321 and the lead screw 2322 are mounted on the rotating base 31, and the lead screw 2322 is parallel to the first sliding rail 2315 and the second sliding rail 2316. An output end of the lift motor 2321 is connected to the lead screw 2322 to drive the lead screw 2322 to rotate, the nut 2323 is in screw-thread fit with the lead screw 2322, and the nut 2323 is fixedly connected to the second sliding block 23121.

When the lift motor 2321 works, the lead screw 2322 rotates, the nut 2323 moves along the lead screw 2322, and drives the second sliding block 23121 to move along the second sliding rail 2316, thereby driving the first supporting rod 2311 and the second supporting rod 2312, so that the locking and unlocking assembly 21 on the mounting seat 233 lifts and lowers.

The lift assembly can also use apparatuses used to drive the lift, such as hydraulic cylinder, air cylinder, electric cylinder, lead screw 2322 and nut 2323 assembly, that is, the scissor-type supporting arm 231 is driven through hydraulic cylinder, air cylinder, electric cylinder, lead screw 2322 and nut 2323 assembly, etc., or the locking and unlocking assembly 21 is directly mounted on an output end of the hydraulic cylinder, air cylinder, electric cylinder, lead screw 2322 and nut 2323 assembly, etc.

By arranging the lift assembly 23, a height of the battery swap apparatus 100 is lowered during the moving process, so that the overall structure of the battery swap apparatus 100 is more compact, its center of gravity is lower, and the passability of the battery swap apparatus 100 is improved;

when the battery swap apparatus 100 reaches the electrical device, the lift assembly 23 lifts the battery swap mechanism 2, that is, the locking and unlocking assembly 21 can be brought close to the chassis 3000 of the vehicle to perform a positioning action, a unlocking and locking action of the battery 2000, thereby completing removing and mounting of the battery 2000.

In some embodiments, the locking and unlocking assembly is floatingly connected to the lift assembly 23.

As shown in FIG. 15, the base plate 211 of the locking and unlocking assembly 21 is located above the mounting seat 233, and the base plate 211 is spaced from the mounting seat 233. The base plate 211 is provided with a plurality of supporting columns 2111. The supporting columns 2111 are bent and extend below the mounting seat 233. The supporting columns 2111 and the mounting seat 233 are connected by chains 2112. The length of the chain 2112 is smaller than the length of the supporting column 2111, so as to keep the base plate 211 spaced from the mounting seat 233, so that the base plate 211 is suspended above the mounting seat 233.

In this embodiment, the base plate 211 is rectangular in shape, an area of the mounting seat 233 is smaller than that of the base plate 211, a horizontal projection of the base plate 211 covers the mounting seat 233, the base plate 211 is provided with four supporting columns 2111, and the four supporting columns 2111 are respectively located at four corners of the rectangle. The mounting seat 233 is provided with four chains 2112 correspondingly, each supporting column 2111 is L-shaped, one end of the L-shape is connected to the base plate 211, and the other end of the L-shape is connected to the chain 2112. The four supporting columns 2111 and the four chains 2112 work together, so that none of the base plate 211 and the four supporting columns 2111 contacts the mounting seat 233, in order to avoid the floating of the locking and unlocking assembly 21 being hindered.

Since the two locking and unlocking assemblies 21 are respectively floatingly arranged on the lift assembly 23, the two locking and unlocking assemblies 21 each have a horizontal adjustment margin during the positioning process. When there is a position error of the locking and unlocking assembly 21 relative to the battery mounting position of the vehicle, the locking and unlocking assembly 21 can move horizontally to adjust the position, so as to ensure that the two batteries 2000 correspond to the battery mounting positions of the vehicle respectively.

According to some embodiments of the present application, the present application provides a battery swap system 1000, as shown in FIG. 1, including a rail 400, the afore-mentioned battery swap apparatus 100, a battery swap platform 300, and a battery picking-and-placing apparatus 200. The battery swap platform 300 is located at one end of the rail 400, the battery picking-and-placing apparatus 200 is located at the other end of the rail 400, and the battery swap apparatus 100 is movably disposed on the rail 400.

Because the battery swap apparatus 100 can replace two batteries 2000 at the same time, the battery swap efficiency is high; the battery swap apparatus 100 also has high battery swap efficiency when only one battery 2000 is replaced; the exchange mechanism 3 of the battery swap apparatus 100 can also adjust the position of the battery swap mechanism 2 and the battery 2000 it carries to adapt to the battery mounting positions of vehicles in different directions. There-fore, the battery swap system 1000 provided in this embodi-ment of the present application has a wide range of appli-cations and meets the battery swap needs of various types of vehicles (or other electrical devices), and the battery swap efficiency is high.

According to some embodiments of the present applica-tion, with reference to FIGS. 3 to 15, the present application provides a battery swap apparatus 100. The battery swap apparatus 100 includes a movable base 1, an exchange mechanism 3 and two battery swap mechanisms 2. The exchange mechanism 3 and the two battery swap mecha-nisms 2 are arranged on the movable base 1, the two battery swap mechanisms 2 are configured to carry two batteries 2000, so that the battery swap apparatus 100 can replace the two batteries 2000 at the same time, and the exchange mechanism 3 is configured to drive the two battery swap mechanisms 2 to exchange positions. Wherein the exchange mechanism 3 includes a driving member 32 and a rotating base 31. The driving member 32 and the rotating base 31 are mounted on the movable base 1, and the driving member 32 is configured to drive the rotating base 31 to rotate on the movable base 1 around a vertical rotation axis a. The driving member 32 is a servo motor. Referring to FIG. 2, the output end of the servo motor is provided with a first gear 321, and the rotating base 31 is provided with a second gear 311. The first gear 321 meshes with the second gear 311, and the servo motor drives the rotating base 31 to rotate via the first gear 321 and the second gear 311. Referring to FIG. 9, the two battery swap mechanisms 2 are arranged on the rotating base 31 at intervals, and the two battery swap mechanisms 2 are symmetrical about the rotation axis a of the rotating base 31.

Each battery swap mechanism 2 includes a lift assembly 23, a locking and unlocking assembly 21 and a protective enclosure 22. The lift assembly 23 is connected to the rotating base 31, the locking and unlocking assembly 21 is connected to the lift assembly 23, and the protective enclo-sure 22 is located on the locking and unlocking assembly 21. The lift assembly 23 includes a scissor-type supporting arm 231, a lift driving member 232 and a mounting seat 233. The scissor-type supporting arm 231 is connected to the rotating base 31 and the mounting seat 233, and the lift driving member 232 drives the scissor-type supporting arm 231 to function, such that the mounting seat 233 is raised or lowered relative to the rotating base 31. The locking and unlocking assembly 21 includes a base plate 211, four locking and unlocking units 212, four positioning members 214 and six supporting members 213, and the four locking and unlocking units 212, four positioning members 214 and six supporting members 213 are all mounted on the base plate 211. The base plate 211 is floatingly connected to the mounting seat 233 through the chains 2112 and the support-ing columns 2111, so that the entire locking and unlocking assembly 21 has a horizontal movement margin relative to the mounting seat 233. The protective enclosure 22 is connected to the base plate 211. The protective enclosure 22 is provided with four first openings 221, four second open-ings 222 and six third openings 223, wherein the four first openings 221 correspond to the positions of the four locking and unlocking units 212, the four second openings 222 correspond to the positions of the four positioning members 214, and the six third openings 223 correspond to the positions of the six supporting members 213. The six supporting members 213 extend from the six third openings 223 to support the battery 2000, the four positioning mem-bers 214 extend from the four second openings 222 and cooperate with the positioning structures on the vehicle to position the battery 2000, the four locking and unlocking units 212 extend from the four first openings 221 to drive the fastening bolt 2001 provided outside the battery 2000 to rotate.

In this embodiment, the six supporting members 213 are evenly arranged in a middle of the base plate 211 to provide uniform supporting force to the battery 2000. Referring to FIG. 4, the four supporting members 213 are configured to support four corners of the battery 2000, the two supporting members 213 are configured to support a middle position of the battery 2000. The four positioning members 214 are distributed on edges of the base plate 211 to allow space for placing the battery 2000. The four locking and unlocking assemblies 21 are disposed near the four supporting members 213 so as to be close to the outer periphery of the battery 2000 to drive the fastening bolt 2001 disposed outside the battery 2000.

As shown in FIGS. 1-4 and 16-20, the battery swap process of the battery swap apparatus 100 is as follows:

In this embodiment, the battery swap process of a vehicle in which both batteries 2000 are arranged transversely is used as an example to describe. In the vehicle in which both batteries 2000 are arranged transversely, the length direction of the battery 2000 is perpendicular to the length direction of the vehicle body, and the two batteries 2000 are arranged along the length direction of the vehicle body. When the vehicle is parked on the battery swap platform 300, the length direction of the vehicle body is perpendicular to the rail 400, and the battery mounting position on the chassis is above the avoidance opening 301 of the battery swap platform 300. The length direction of the vehicle body in this present application is the direction from a front of the vehicle to a rear of the vehicle. That is, when the vehicle is parked on the battery swap platform 300, the front of the vehicle is located above one side of the rail 400, the rear of the vehicle is located above the other side of the rail 400, and the two batteries 2000 are arranged along the direction from the front to the rear of the vehicle and connected to the battery mounting positions on the chassis, and the battery 2000 is above the avoidance opening 301.

Figures 16, 17:
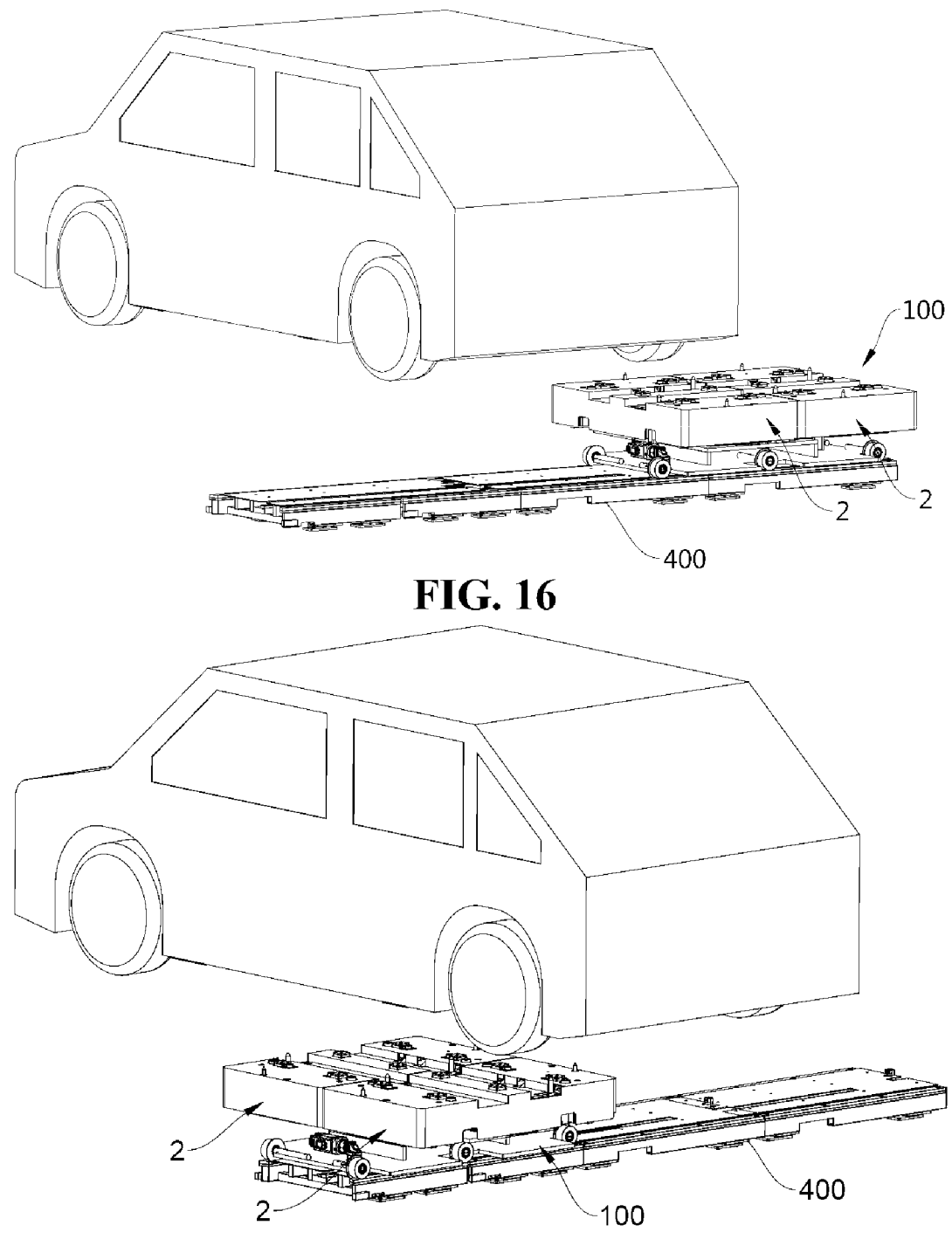
FIG. 16 is a schematic view of a process of moving the battery swap apparatus to the bottom of the vehicle provided by an embodiment of the present application.
FIG. 17 is a schematic view of the battery swap apparatus before removing the battery provided by an embodiment of the present application.

Referring to FIG. 16, the battery swap apparatus 100 moves along the rail 400 to the battery swap platform 300 without load until it moves below the avoidance opening 301 of the battery swap platform 300, and then the driving member 32 drives the rotating base 31 to rotate by 90°, and the two battery swap mechanisms 2 are adjusted in position, as shown in FIG. 17, so that the two battery swap mechanisms 2 respectively correspond to the two battery mounting positions arranged transversely on the chassis.

Next, the lift assembly 23 lifts the locking and unlocking assembly 21, the positioning member 214 on the locking and unlocking assembly 21 cooperates with the positioning structure (i.e., the second pin hole) on the chassis, the positioning member 214 is a pin with a conical end. When there is an error in the position of the locking and unlocking assembly 21, an inner wall of the second pin hole acts on the conical portion of the pin and generates a guiding force, so that the base plate 211 moves horizontally relative to the mounting seat 233, so that the second pin hole aligns with the pin, such that the locking and unlocking assembly 21 can be adjusted to the exact position adaptively.

The lift assembly 23 continues to lift, and the supporting member 213 on the locking and unlocking assembly 21 contacts the battery 2000. When the lift assembly 23 lifts into place, the battery 2000 compresses the supporting member 213, the locking and unlocking unit 212 cooperates with the fastening bolt 2001 on the battery 2000, the locking and unlocking unit 212 screws the fastening bolt 2001 out of the chassis to unlock the battery 2000 to be charged.

Figures 18, 19:
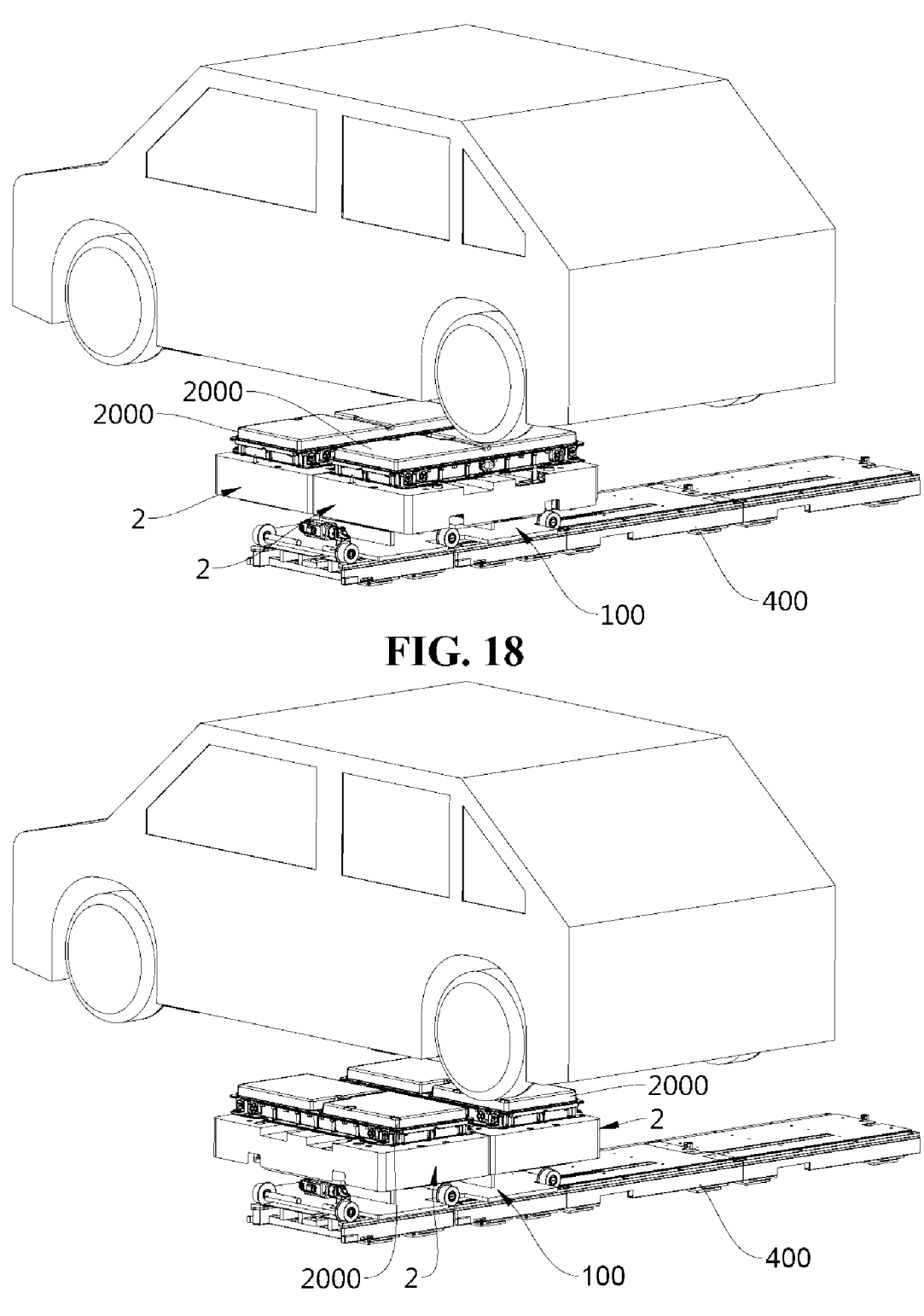
FIG. 18 is a schematic view of the battery swap apparatus after removing the battery provided by an embodiment of the present application.
FIG. 19 is a schematic view of the process of moving the battery swap apparatus to the battery picking-and-placing apparatus provided by an embodiment of the present application.

As shown in FIG. 18, after the unlocking assemblies 21 of the two battery swap mechanisms 2 unlock the batteries 2000 respectively, the lift assembly 23 lowers, and the two battery swap mechanisms 2 carry the respective unlocked batteries 2000 to be charged. Next, as shown in FIG. 19, the driving member 32 drives the rotating base 31 to rotate by 90° to adjust the positions of the two battery swap mechanisms 2. The battery swap apparatus 100 moves toward the battery picking-and-placing apparatus 200 along the rail 400.

Figure 20:
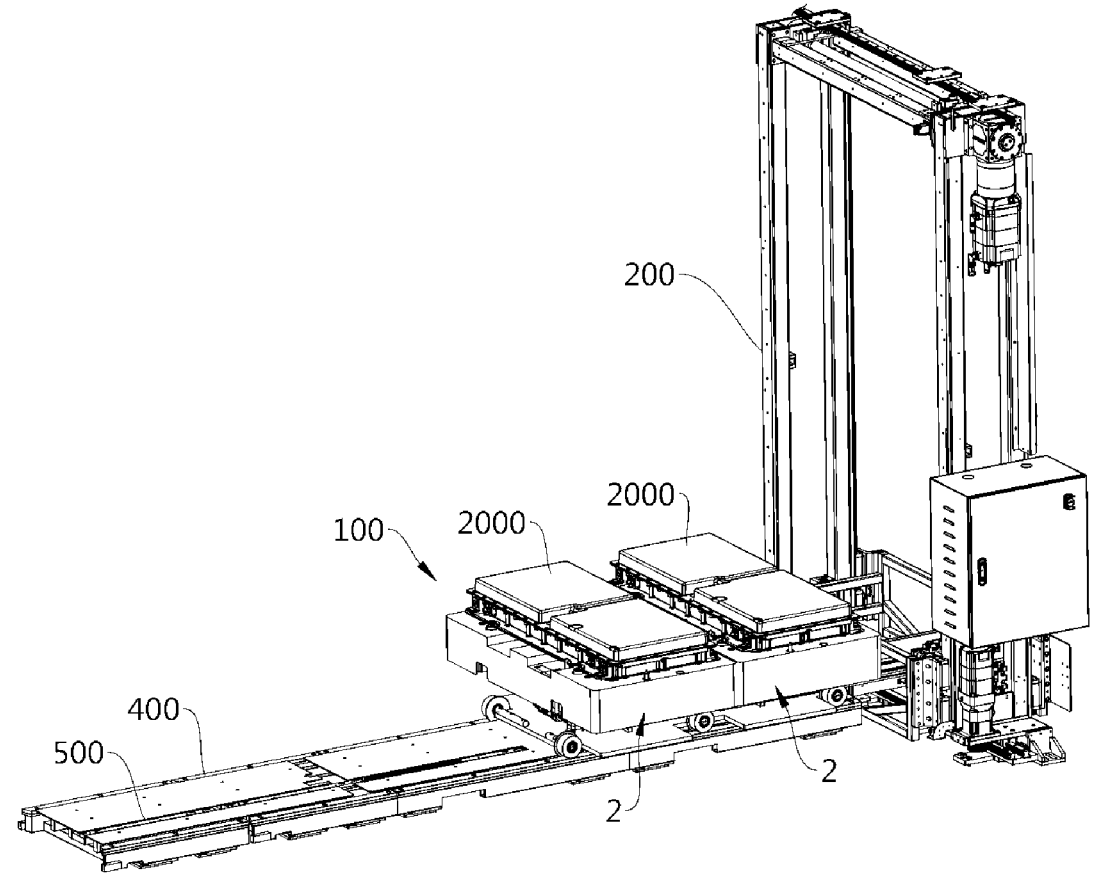
FIG. 20 is a schematic view of picking and placing the battery on the battery swap apparatus by the battery picking-and-placing apparatus provided in this embodiment.

As shown in FIG. 20, the battery swap apparatus 100 is returned to the battery picking-and-placing apparatus 200 as a whole along the rail 400. One of the battery swap mechanisms 2 is close to the working range of the fork 201 of the battery picking-and-placing apparatus 200, and the fork 201 is inserted into the slot 224 of the protective enclosure 22 of the battery swap mechanism 2, lifts the battery 2000 to be charged up from the battery swap mechanism 2, and places it back into the battery charging apparatus, and then places the fully charged battery 2000 in the battery swap mechanism 2. During the process of placing the fully charged battery 2000, the positioning member 214 on the locking and unlocking assembly 21 cooperates with the first pin hole 2002 on the battery 2000. When there is an error in the position of the battery 2000, inner wall of the first pin hole 2002 acts on conical portion of the pin and creates a guiding force, so that the base plate 211 moves horizontally relative to the mounting seat 233, thereby aligning the first pin hole 2002 with the pin, thereby enabling accurate positioning of the battery 2000.

Then, the driving member 32 drives the rotating base 31 to rotate by 180°, and the two battery swap mechanisms 2 exchange positions, so that the other battery swap mechanism 2 is within the working range of the fork 201 of the battery picking-and-placing apparatus 200, and the battery picking-and-placing apparatus 200 repeats the action to pick up the battery 2000 to be charged from the other battery swap mechanism 2 and place the fully charged battery 2000.

After the two batteries 2000 are updated, the battery swap apparatus 100 carries the two fully charged batteries 2000 and moves along the rail 400 to the battery swap platform 300, the driving member 32 drives the rotating base 31 to rotate by 90°, and the two battery swap mechanisms 2 adjust their positions, such that the two battery swap mechanisms 2 correspond to the two battery mounting positions on the chassis, respectively again. The lift assembly 23 lifts the locking and unlocking assembly 21, and the positioning member 214 cooperates with the second pin hole on the chassis to guide the locking and unlocking assembly 21 and the battery 2000 to accurately locate relative to the chassis of the vehicle to ensure that the battery 2000 enters the battery mounting position. Next, the locking and unlocking unit 212 drives the fastening bolt 2001 on the battery 2000 to cooperate with the movable nut 3001 on the chassis to lock the battery 2000.

After the two batteries 2000 are locked, the lift assembly 23 lowers and returns to the initial position to stand by for the next battery swap. The initial position is any position on the rail 400 that does not affect the operation of the battery picking-and-placing apparatus 200 and the battery swap platform 300.

The above are only preferred embodiments of the present application, and are not intended to limit the present application. For those skilled in the art, the present application may have various modifications and changes. Any modifications, equivalent replacements, improvements, etc. made within the spirit and principle of the present application shall be included within the scope of protection of the present application.

What is claimed is:

1. A battery swap apparatus for replacing a battery of an electrical device, comprising:

a movable base configured to drive the battery swap apparatus to move;

two battery swap structures arranged on the movable base, the two battery swap structures being configured to carry two batteries so that the battery swap apparatus replaces the two batteries at the same time; and an exchange structure arranged on the movable base, the exchange structure being configured to drive the two battery swap structures to exchange positions, wherein each of the battery swap structures comprises a locking and unlocking assembly and a protective enclosure, the locking and unlocking assembly comprises a base plate and a locking and unlocking structure, the locking and unlocking structure is configured for locking or unlocking the battery, the protective enclosure covers the top of the base plate, and the protective enclosure is provided with a first opening through which the locking and unlocking structure extends, and the locking and unlocking assembly further comprises a positioning structure for positioning the battery and a supporting structure for supporting the battery, and the protective enclosure is provided with a second opening through which the positioning structure extends and a third opening through which the supporting structure extends.

2. The battery swap apparatus according to claim 1, wherein the exchange structure comprises a driver and a rotating base, the driver is configured to drive the rotating base to rotate, and the two battery swap structures are mounted on the rotating base and are symmetrically arranged about a rotation axis of the rotating base.

3. The battery swap apparatus according to claim 2, wherein the driver is fixed to the movable base, the exchange structure further comprises a first gear and a second gear that mesh with each other, the first gear is mounted on an output end of the driver, and the second gear is fixed on the rotating base.

4. The battery swap apparatus according to claim 1, wherein the two battery swap structures are arranged at intervals.

5. The battery swap apparatus according to claim 1, wherein a side of the protective enclosure away from the locking and unlocking assembly is provided with a slot, and the slot is configured for insertion of a fork to pick and place the battery.

6. The battery swap apparatus according to claim 1, wherein each of the battery swap structures further comprises a lift assembly, and the lift assembly is configured to lift the locking and unlocking assembly.

7. The battery swap apparatus according to claim 6, wherein the locking and unlocking assembly is floatingly connected to the lift assembly.

8. A battery swap system, comprising:

a rail;

the battery swap apparatus according to claim 1 that is movably arranged on the rail;

a battery swap platform located at one end of the rail; and a battery picking-and-placing structure located at the other end of the rail.

* * * * *